ABSTRACT

United States Patent [19]

Detrick

[11] 4,020,052
[45] Apr. 26, 1977

[54] TREATMENT OF AROMATIC AMINES WITH GAS MIXTURES DERIVED FROM THE OXIDATION OF AMMONIA TO EFFECT DIAZOTIZATION/COUPLING

[75] Inventor: John Kent Detrick, Woodbury, N.J.
[73] Assignee: E. I. Du Pont de Nemours and Company, Wilmington, Del.
[22] Filed: Nov. 25, 1975
[21] Appl. No.: 635,059
[52] U.S. Cl. .......................... 260/140 R; 260/141; 260/205; 260/576; 423/235; 423/245; 423/403
[51] Int. Cl.$^2$ ............... C01B 21/26; C07C 113/00; C07C 115/00
[58] Field of Search ................ 260/140; 423/403

[56] References Cited
UNITED STATES PATENTS

| | | | |
|---|---|---|---|
| 2,133,037 | 10/1938 | Moyer | 260/140 |
| 2,894,942 | 7/1959 | Hydro et al. | 260/205 |

OTHER PUBLICATIONS

Filippuichev et al, Chemical Abstracts, vol. 28, 3720, 7–8 (1934).
Sutcliffe et al, Chemical Abstracts, vol. 69, No. 87957p (1968).
Houben–Weyl, "Methoden der Organischen Chemie", vol. X/3, p. 712 (1965).
Remy, "Treatise on Inorganic Chemistry", vol. I, pp. 598 and 599 (1956).

Primary Examiner—Floyd D. Higel

[57] ABSTRACT

1,3-Diaryl triazenes, e.g., 1,3-diphenyltriazene, intermediates in the synthesis of aromatic diamines, e.g., p-phenylenediamine, are prepared by catalytically oxidizing ammonia, and subsequently the resulting nitric oxide, with a gas comprising diluted molecular oxygen, e.g., air, so as to produce a gas mixture containing dilute $NO_x$, i.e., $NO_2$ preferably admixed with NO, x being $(1 + n)$, wherein $n$ is the $NO_2$ fraction of the $NO_x$; and contacting the gas mixture, preferably at a temperature in the range of about from 25° to 350° C., with excess primary aromatic monoamine, e.g., aniline, so as to result in a monoamine temperature in the range of about from 25° to 90° C., preferably 40° to 60° C., during contact. Highest yields of triazene are obtained when the x in $NO_x$ is about from 1.3 to 1.7, and the amount of $NO_x$ gas mixture contacted with the monoamine and the time of contact are such that at least about 60% by weight of the monoamine remains unconsumed. A gas mixture temperature just prior to gas contact with the liquid monoamine in the range of about from 110° to 275° C. is more preferred under certain circumstances.

14 Claims, No Drawings

TREATMENT OF AROMATIC AMINES WITH GAS MIXTURES DERIVED FROM THE OXIDATION OF AMMONIA TO EFFECT DIAZOTIZATION/COUPLING

BACKGROUND OF THE INVENTION

1. Field of the Invention

The present invention relates to the formation of 1,3-diaryl triazenes, e.g., 1,3-diphenyltriazene, by the diazotization-coupling of primary aromatic monoamines, e.g., aniline.

2. Description of the Prior Art 1,3-Diaryl triazenes (also referred to as diazoamino aryl compounds) can be made to undergo rearrangement by heating, e.g., in the presence of a Friedel-Crafts catalyst, to form aromatic amino azo compounds. The latter are useful for the preparation of aromatic diamines by reduction with hydrogen. The diamines, in turn, are useful as intermediates in the preparation of polymers, antioxidants, etc.

U.S. Pat. No. 2,894,942 describes the formation of aromatic amino azo compounds by adding an inorganic nitrite to a mixture of an excess of a primary aryl monoamine, a mineral acid, and a Friedel-Crafts catalyst while the temperature is 0°–50° C. (20°–30° C. preferred), and thereafter heating up to about 40°–75° C. (45°–55° C. preferred). A portion of the amine is diazotized and the diazonium salt couples with unreacted amine to form the diazoamino aryl compound, which rearranges to the amino azo compound under the combined influence of the catalyst and heat. One of the disadvantages of this process, when considered in terms of large-scale operations, is the need for separating and disposing of the salt, e.g., sodium chloride, produced as a by-product of the diazotization reaction.

Over a period of a century or more, publications occasionally have appeared describing the diazotization of primary aromatic amines by the use of certain nitrogen oxides. For example, Griess, in 1862 (Ann. 121, No. 3, 257–280), reported the synthesis of diazoaminobenzene by passing what he called "a weak stream of nitrous acid" into a cold solution of aniline in alcohol until all of the aniline was consumed. Griess used the formula "$NO_3$" to denote the nitrous acid, but did not describe the composition or derivation of his diazotizing agent.

U.S. Pat. No. 2,622,078 (Klaassens et al.) describes carrying out the diazotization of amino aromatic sulfonic acids to diazonium compounds in water-ketone mixtures. Although nitrous gas (described as $N_2O_3$ or a mixture of NO and $NO_2$ of a composition approximating that of $N_2O_3$) was disclosed to be useful in the Klaassens et al. process, the gas was introduced at 20° C. into a mixture of acetone of butanone, water, and nitric acid, and the amino compound was added to the mixture while the temperature was maintained below 35° C. Thus, Klaassens et al. used conditions which led to the formation of nitrous acid. Furthermore, Klaassens et al. operated with full consumption of their amine to produce the diazonium compound, and effected no coupling of the diazonium compound.

Lovejoy et al., J. Chem. Soc. (A) 1968, 2325–8, reported the formation of a diazonium nitrite by the reaction of a primary atomatic amine in an organic solvent with liquid, undissociated dinitrogen trioxide at −85° C., as well as the isolation of a small amount of the diazoamino compound in some cases. However, the authors did not describe the action of gaseous nitrogen trioxide on the amines, nor did they disclose the conditions that would be required to produce a diazoamino compound as a major product.

The diazotization of aromatic amines by means of $N_2O_3$ gas in the absence of water solvent, followed by coupling of the resulting diazo compound with phenols or naphthols also in the absence of water solvent is described in Japanese Patent Application Publication 15,631/61 (Sept. 7, 1961).

Primary aromatic amines also have been diazotized in solvents by means of pure nitrogen tetroxide. O. N. Witt, Tagbl. Natf.-Vers. Baden-Baden 1879, 194 (Chem. Zentr. 1880, II, 226) reported obtaining benzenediazonium nitrate by the reaction of anhydrous pure nitrogen tetroxide with aniline in an anhydrous benzene solution; and B. Houston et al., J. Am. Chem. Soc. 47, 3011–3018 (1925), obtained a diazoaminobenzene derivative as well as the corresponding diazonium nitrate by the action of pure, anhydrous nitrogen tetroxide on o-, m-, and p-nitroaniline in an anhydrous benzene solution.

SUMMARY OF THE INVENTION

The present invention provides a process for the diazotization-coupling of primary aromatic monoamines by means of a nitrogen oxide-containing gas mixture derived from the oxidation of ammonia.

The process of the invention comprises, in sequence, catalytically oxidizing ammonia by means of a gas comprising molecular oxygen, preferably air, so as to produce a gas mixture comprising a nitrogen oxide component selected from the group consisting of nitrogen dioxide ($NO_2$) and mixtures of nitrogen dioxide and nitric oxide, the nitrogen oxide component being represented by the formula $NO_x$ wherein $x$ is $(1+n)$, $n$ being the $NO_2$ fraction of the nitrogen oxide component, and generally has a value of 1.1 to 2.0; and contacting the gas mixture, preferably at a temperature in the range of about from 25°–350° C., with a preferably neat primary aromatic monoamine, e.g., aniline, in the liquid phase so as to result in a monoamine temperature in the range of about from 25° to 90° C., preferably 40° to 60° C., during contact, while maintaining at least about 5, and preferably at least about 40, percent by weight of unconsumed monoamine.

Although hot ammonia oxidation gases have heretofore been absorbed in inorganic liquids, e.g., to produce ammonium nitrite (U.S. Pat. Nos. 2,797,144 and 2,805,122) and sodium nitrite (British Pat. No. 1,347,909), the bringing together of a primary aromatic monoamine, i.e., a strong reducing agent, and the hot gas obtained by the oxidation of ammonia is contrary to the natural inclination of those skilled in the art because of doubts concerning the controllability of the reaction between such materials. Contrary to expectations, however, it has been found that the reaction between hot ammonia oxidation gas and an aromatic monoamine can be effected smoothly and controllably.

In addition to the nitrogen oxide component, the $NO_x$-containing gas mixture produced by the oxidation of ammonia also contains an inert diluent, e.g., nitrogen, and water vapor, the $NO_x$ concentration usually being about 10–12 mole percent. This gas mixture can be contacted intact with the monoamine, and this is the preferred practice. There is no advantage in removing water vapor from the mixture prior to contacting it with the monoamine, although it is within the scope of this invention to do so.

From the viewpoint of maximizing the yield of 1,3-diaryl triazene, the present process preferably is carried out using (1) $NO_x$ wherein x is in the range of about from 1.3 to 1.7; (2) an amount of gas mixture contacted with the monoamine and a time of contact such that at least about 60 percent by weight of the monoamine remains unconsumed; and (3) a temperature of the gas mixture just prior to its contact with the monoamine which is in the range of about from 110° to 275° C.

DETAILED DESCRIPTION

In the present process, ammonia gas and a gas comprising diluted molecular oxygen, preferably air, are passed over a catalyst at elevated temperature whereby the ammonia is oxidized to nitric oxide (NO); and the resulting gas, comprising a mixture of nitric oxide, oxygen, water vapor, and diluent, e.g., nitrogen, is cooled whereby the nitric oxide is oxidized, either completely but preferably only in part, to nitrogen dioxide ($NO_2$), resulting in a gas mixture comprising nitrogen dioxide ($NO_2$), preferably also nitric oxide, the diluent, water vapor, and, depending on the specific conditions used, possibly some residual oxygen. The nitrogen oxide component of the gas mixture, i.e., $NO_2$ or $NO_2$/NO, is represented by the formula $NO_x$ wherein x is (1 + n) and generally has a value of from about 1.1 to 2 (n is the $NO_2$ fraction of the nitrogen oxide component). Under the usual circumstances, the $NO_x$ concentration of the gas mixture produced is about 10–12 mole percent, but it can be adjusted as will be described hereinafter to span the range of about from 1 to 20 mole percent, and even up to about 30 mole percent, and such concentrations can be used for the diazotization/coupling reaction.

In the present process, therefore, the nitrogen oxide(s) used in the diazotization/coupling reaction are present in diluted form. As such, the diazotization/coupling gas of this process is readily distinguishable from the pure $N_2O_3$ and $N_2O_4$ which have been described in the art relating to diazotization reactions. It now has been found that the diazotization/coupling of primary aromatic monoamines can be brought about by contact with the dilute $NO_x$ gas mixtures produced by the oxidation of ammonia. The use of the dilute gas mixtures not only has the advantage that the diazotizing gas is more readily obtainable, but also is beneficial in allowing a smoother, more easily controllable reaction and therefore reducing the possibility of yield losses associated with an uncontrolled reaction at the gas-liquid interface. Also, as contrasted to the prior art nitrite/acid diazotization method, the present process produces no salt by-products requiring troublesome salt separation procedures.

The oxidation of ammonia, and subsequently of the resulting nitric oxide, by air at elevated temperature to produce gas mixtures containing $NO_x$ as defined above has been amply described in the literature. For the oxidation to nitric oxide, usually a platinum or platinum alloy catalyst is used, together with temperatures in the range of about from 800° to 950° C. Pressures of about from atmospheric to 120 psiga (8.16 atm) have been used. Oxygen-enriched air also can be used. The ammonia content of the ammonia/air mixture generally ranges about from 11 to 13 mole percent, and the oxygen/ammonia mole ratio about from 1.3/1 to 1.7/1.

Further details can be learned by reference to *Mellor's Comprehensive Treatise on Inorganic and Theoretical Chemistry*, Vol. VIII, Suppl. II, Sec. XXIX; or *Riegel's Handbook of Industrial Chemistry*, Ed. 7, Van Nostrand, 1974, pp. 94–98, the disclosures of which are incorporated herein by reference.

In contrast to the oxidation of ammonia, the oxidation of nitric oxide occurs at a less elevated temperature, e.g., in the range of about from 100° to 500° C., the rate of oxidation being higher at lower temperatures and higher pressures. The value of x in the $NO_x$ component, which is a measure of the state of oxidation of the nitrogen oxide component, can be varied by suitable selection of the pressure, temperature, and contact time of the gases in the NO oxidizer, the $NO_2$ fraction of the $NO_x$ produced increasing with the contact time. The contact time required to produce a desired $NO_2$ fraction can be determined from known rates of oxidation at various temperatures and pressures.

The $NO_x$ component can be $NO_2$ alone, but preferably is a combination of $NO_2$ and NO. When $NO_x$ is $NO_2$ alone, i.e., when x is 2, the yield of 1,3-diaryl triazene is apt to be lower owing to (1) a competing nitration reaction, which results, for example, in the formation of p- and o-nitroanilines when the reactant is aniline, and (2) rearrangement of the triazene to the amino azo compound catalyzed by nitric acid produced as as by-product. Although the nitro and amino azo products are also useful in that they can be reduced to diamines, it is preferred that as much of the monoamine as possible be converted to the triazene in the diazotization/coupling step, and for this reason an $NO_x$ wherein x is less than 2 is preferred. Minimizing the formation of the amino azo compounds during the diazotization-coupling decreases the likelihood of the formation of by-products which could be subsequently prove troublesome.

The value of x in $NO_x$ will be at least about 1.1 and preferably at least about 1.3. As the $NO_2$ fraction of the mixture decreases, more of the nitric oxide is unutilized and conversion to the triazene consequently is low. At very low $NO_2$ fractions, excessive quantities of unutilized nitric oxide would have to be handled. Preferably x has a value no greater than about 1.7 so as to avoid the increased chance that rearrangement, nitration, and/or oxidation reactions will occur, which reactions could subsequently prove troublesome, as mentioned previously. On the basis of good utilization of the nitric oxide as well as the minimizing of side-reactions, an $NO_x$ wherein x is close to a value of about 1.5 (50/50 $NO_2$/NO mixtures), e.g., about 1.4 to 1.6, is especially preferred.

The $NO_x$ concentration of the gas mixture produced by the air oxidation of nitric oxide usually is about 10–12 mole percent, and depends on the oxygen/ammonia mole ratio and the yield, higher oxygen/ammonia ratios and yields being associated with higher $NO_x$ concentrations. In theory, up to about 17% $NO_x$ is attainable. A range of from about 1 to 20 mole percent $NO_x$ can be achieved by dilution or water vapor removal, for example, and mixtures having such concentrations can be used in the diazotization/coupling step. Mixtures having a higher $NO_x$ concentration, e.g., up to about 30 mole percent, are attainable by combining the 1–20 percent mixtures with more highly concentrated mixtures, and also can be used in the diazotization/coupling step. However, concentrations above about 12 mole percent are not preferred owing to the added expense of achieving such concentrations and the loss of the beneficial effects of dilution with respect to reaction control. Also, in the diazotization/coupling, there appears to be no benefit resulting from diluting, or removing water vapor from, the mixture produced by the nitric oxide oxidation, and accordingly the 10–12 mole percent $NO_x$ concentration is preferred.

In the present process the temperature of the $NO_x$-containing gas mixture just prior to its contact with the monoamine preferably is in the range of about from 25° to 350° C., and more preferably from 110° to 275° C. When, as in the usual case, water vapor is present in the mixture, a gas temperature of at least about 110° C. prevents the condensation of water vapor from the gas with the attendant formation of nitric acid, which catalyzes the rearrangement of the 1,3-diaryl triazene to the amino compound. Above about 350° C., oxidative degration of the monoamine occurs, and furthermore it becomes more difficult to maintain higher states of oxidation of the $NO_x$ at such temperatures, owing to the increased rate of decomposition of nitrogen dioxide into nitric oxide and oxygen. Temperatures above about 275° C. are not preferred when oxygen is to be excluded, and also because strenuous cooling measures are required to mantain the amine in the required temperature range, as will be described ater. The present process involves advantageously contacting the monoamine with a considerably hotter gas for diazotization than was employed in the procedures described in the prior art.

The diazotization-coupling temperature, or the temperature at which the monoamine is maintained while it is in contact with the $NO_x$-containing gas mixture, is in the range of about from 25° to 90° C., and preferably 40° to 60° C. Temperatures above about 90° C. are not employed owing to the instability of the triazene and consequent yield losses. The specific temperature employed will depend on various factors. First, the temperature of the amine rises when it is contacted with the hot $NO_x$ gas mixture as a result of the heat of reaction as well as of the heat transferred to the amine from the hot gas. Consequently, it will be convenient to employ a reaction temperature in the vicinity of the temperature which results from these exothermic and transfer conditions and which can be maintained easily by modest cooling techniques, e.g., water cooling.

The reaction temperature used may be selected also on the basis of the solubility of the triazine and the amount of amine consumed. If a homogeneous product is desired, it may be desirable to employ a temperature at which the triazine is soluble in the amine at the operating consumption level. For example, 1,3-diphenyl-triazene is sufficiently soluble in aniline at 50°–55° C. that at such temperature the product is homogeneous when about 20–40% of the aniline has been consumed. At consumption levels above 40%, higher temperatures are required for homogeneity. Therefore, in the diazotization/coupling of aniline, a temperature of about 50°–55° C. is especially preferred at consumption levels up to about 40%, and higher temperatures at higher consumption levels, e.g., up to about 90° at consumption levels above about 40%.

Temperatures as low as about 25° C. can be employed in the diazotization-coupling reaction, homogeneity in the case of aniline still being attainable at this temperature at a 20% consumption level. The range of about from 40° to 60° C. is preferred on the basis of all factors considered, i.e., yield, ease of maintaining temperature, homogeneity of product, etc.

The diazotization-coupling process operates satisfactorily at atmospheric pressure although elevated pressures, usually those employed in the nitric oxide oxidation, e.g., up to about 120 psiga, can be used.

In the present process, the $NO_x$-containing gas mixture is contacted with an excess of monoamine so that the initially formed diazonium salt (nitrite or nitrate) can couple instantaneously with unreacted monoamine to form a 1,3-diaryl triazene. "Excess" monoamine means that unconsumed or unreacted monoamine is present in the reaction mixture at all times, with at least about 5 percent, and preferably at least about 40 percent, of the monoamine remaining unconverted to products. If the contact between the $NO_x$ and the reaction mixture is interrupted while at least about 5 percent of the monoamine remains unconsumed, the build-up of uncoupled diazonium nitrate in the reaction mixture can be avoided. The accumulation of such salts anywhere in the reaction system is undesirable because of the potential explosion hazard created thereby.

The monoamine is reacted in the liquid phase. A solvent or diluent is not required with monoamines which are liquid under the reaction conditions, and for economic reasons these preferably are employed in the neat condition. If the monoamine is a solid under the reaction conditions, a solvent therefor can be used, e.g., an aromatic hydrocarbon such as benzene or xylene, or a halogenated aliphatic hydrocarbon such as carbon tetrachloride or methylene chloride. The presence of a solvent or a diluent liquid such as water with a liquid monoamine has no adverse effect on the reaction.

There should be sufficient liquid in the reaction mixture to form a stirrable slurry or slush, or a solution, with the solid triazene formed. Otherwise, even if excess monoamine is present, the diffusion of the gas through the reaction mixture may be so slow that the diazonium nitrate can accumulate on the surface of the solid triazene as a result of a reaction between the gas and the triazene. For this reason, when the amount of unconsumed monoamine is at a level as low as 5%, another solvent is employed to maintain stirrability. With larger amounts of unconsumed monoamine present, the required mobility of the reaction mixture may be achieved with neat monoamine by employing higher reaction temperatures. Preferably, the reaction product is a homogeneous liquid and for this reason, when neat monoamine is used, the amount thereof remaining unconsumed is sufficient to act as a solvent for the triazene.

In any case, whether neat, dissolved, or diluted monoamine is used, the contact between the $NO_x$ gas and the reaction mixture preferably is broken while at least about 40 percent, and most preferably at least about 60 percent, by weight of the monoamine remains unconsumed. The yield of triazene drops off sharply owing to rearrangement when the unconsumed monoamine falls below about 40 percent, and the yield drop may even become significant when the unconsumed monoamine falls below about 60 percent. Preferably, the unconsumed monoamine will not exceed about 85 percent to avoid the handling and work-up of excessively large volumes of materials containing low concentration of the triazene. In a semi-batch-type operation, the $NO_x$ gas is added to the monoamine, and the addition stopped when the selected monoamine consumption has been reached, as can be determined by analysis of the reaction mixture. In a continuous operation the product stream is separated from the gas stream when the selected monoamine consumption has been reached, as can be determined by analysis of the product stream.

If small amounts of monoamine vapor are present in the reaction off-gas, it is possible that the diazonium nitrate will form in the off-gas lines and accumulate therein if $NO_x$ is present in excess with respect to monoamine vapor. The deposition of the nitrate can be avoided by the adoption of measures which will prevent its formation in the first place, or prevent the accumulation thereof, e.g., smooth thermal decomposition. One such measure is to maintain the walls of the off-gas lines at a temperature at which the rate of diazonium nitrate decomposition is at least as high as the rate of diazonium nitrate formation, e.g., above about 50° C. in the case of benzenediazonium nitrate. Another is to limit the time between the separation of the off-gas from the reaction liquid and the arrival of the off-gas in a disposal system such as a monoamine separator, e.g., wherein the off-gas is bubbled into a monoamine scrubber. The time that will elapse before the diazonium nitrate begins to form depends on the rates of the reactions which must occur in the off-gas before the conditions for diazonium nitrate formation are reached, e.g., the rate of oxidation of nitric oxide to nitrogen dioxide by oxygen in the off-gas and the reaction of the resulting $NO_x$ with excess aniline vapor to form the triazene. When an off-gas at a temperature of 50° C. and a pressure of one atmosphere and containing (by volume) 1% nitric oxide, 3% oxygen, and 0.5% aniline passes through an off-gas line having a 25°–35° C. wall temperature, benzenediazonium nitrate deposition occurs in about 5 seconds. Therefore, in this case, limiting the residence time of the gas in the pipeline to about 4 seconds or less safely avoids the deposition of the nitrate on the pipe walls. The higher the pressure of the gas, or the higher the nitric oxide or oxygen concentration, the lower the residence time required to avoid nitrate deposition.

In a peferred process, diazonium nitrate formation in the off-gas from the diazotization-coupling reaction is avoided by eliminating nitrogen dioxide therefrom. Within the preferred range of $NO_x$, i.e., wherein $x$ is 1.3 to 1.7, unreacted nitric oxide goes off in the off-gas, but nitrogen dioxide does not. The formation of nitrogen dioxide in the off-gas is avoided if molecular oxygen is absent. Therefore, the conditions employed in the ammonia and nitric oxide oxidation steps preferably are those which result in a $NO_x$-containing gas mixture that is essentially free, i.e., contains less than 500 parts per million, of oxygen. In this way, practically no oxygen will appear in the off-gas, thereby minimizing the rate at which the nitric oxide therein can be oxidized to nitrogen dioxide. To achieve the substantial absence of oxygen, the ammonia concentration of the ammonia-oxygen-containing gas mixture preferably is as high as possible within the safe operating range, e.g., about from 11 to 13 mole percent ammonia. Also, in the nitric oxide oxidation, the contact time is sufficient to permit full consumption of the oxygen, and the temperature of the gas mixture produced does not exceed about 275° C. at atmospheric pressure, thereby minimizing the chances that the reverse reaction, i.e., nitrogen dioxide decomposing into nitric oxide and oxygen, will occur.

Agitation of the reaction mixture has no notable effect on the course of the reaction per se, but helps to disperse the gas in the monoamine and promote good contact between gas and liquid phases.

The present process is applicable to the diazotization-coupling of unsubstituted primary carbocyclic aromatic monoamines, e.g., aniline and α- and β-naphthylamine, as well as of primary carbocyclic aromatic monoamines having substituents which are intert to $NO_x$, e.g., alkyl, halo, haloalkyl, alkoxy, and nitro substituents. Preferred alkyl, haloalkyl, and alkoxy substituents have 1 to 4 carbon atoms. Suitable substituted monoamines include, for example, o- and m-toluidines; 2,3-, 2,5-, 2,6-, and 3,5-dimethylanilines, trifluoromethylaniline; and o- and m-chloro-, bromo-, fluoro-, and nitroanilines.

The invention is illustrated by the following examples.

EXAMPLE 1

A gas mixture having the composition (molar) 4.5% NO, 6.8% $NO_2$, 68.8% nitrogen, and 19.9% water vapor (11.3% $NO_x$ concentration; $x = 1.6$) is obtained when an ammonia/air mixture containing 12.1 mole percent ammonia, 18.1 mole percent oxygen, and 1.7 mole percent water vapor (from ambient air) is passed over a platinum-rhodium alloy (10% rhodium) gauze catalyst heated to 900° C. at a pressure of 120 psi (8.16 atmospheres) and the resulting gas mixture is cooled to a temperature of 200° C. and held at about the same pressure. Under the latter conditions, all of the oxygen is consumed in about 3 seconds.

Aniline (132.4 grams) at room temperature is charged to a 150-milliliter glass reactor equipped with an agitator, an outer condenser sleeve, a heated sidearm capillary gas inlet tube (near the bottom of the reactor), a thermocouple, and a 150-millimeter-long upper exit tube connected to a 150-millimeter-long water-cooled condenser.

The above-described gas mixture, at an average temperature of 200° C. (175°–225° C.) and a pressure of one atmosphere, is fed into the room-temperature aniline via the heated gas inlet tube at a rate of 342 milliliters per minute. During the addition of the gas, the aniline is stirred at about 2000 revolutions per minute. The bulk temperature of the aniline rises to 45°–50° C. and is maintained there by air cooling. Off-gases (containing 0.5–0.7 vol. % NO, no $NO_2$, and no oxygen) leave the reactor through the exit tube and condenser at a rate of 274 milliliters per minute, and are vented to the atmosphere. Hold-up time in the 25° C. exit tube and condenser is about 11 sec. No benzenediazonium nitrate deposition is observed in the off-gas line.

The gas flow is stopped after 180 minutes, whereupon the reaction mixture is allowed to cool to 30° C., and the organic layer separated from the aqueous layer. The composition of the organic layer (133.2 grams), after neutralization, by weight, is as follows: 19.8% 1,3-diphenyltriazene, 1.63% p-aminoazobenzene, 0.121% o-aminoazobenzene, 0.177% o-, m-, and p-aminodiphenyls, 0.086% $HNO_3$, 1.9% $H_2O$, and 73.1% aniline. Based on total accountable organic products, 21.7% of the aniline has been converted to products after 180 minutes. On this basis, the yield of 1,3-diphenyltriazene is 91.1% (weight of triazene divided by the weight of total accountable solids derived from aniline).

When o- or m-toluidine is substituted for aniline in the above procedure, 1,3-o- or 1,3-m-tolyltriazene, respectively, is obtained with similar results.

EXAMPLE 2

The procedure described in Example 1 is followed with the exception that the bulk aniline temperature is maintained at 25° C. with water cooling. The weight of the organic layer is 139.8 grams. Based on an aniline conversion of 20.3%, the yield of 1,3-diphenyltriazene is 96.1%, p-aminoazobenzene 3.8%, and o-aminoazobenzene 0.26%. The off-gas at 25° C. contains 0.5–7% NO, nitrogen, aniline, and water (no $NO_2$ or oxygen). No benzenediazonium nitrate deposition is observed on the 25° C. wall of the exit tube and condenser in the 11 second hold-up time.

EXAMPLE 3

The procedure described in Example 1 is repeated with the exception that a 300-milliliter reactor is employed and the gas mixture used has the composition (molar) 10% $NO_2$ and 90% nitrogen. This mixture is obtained when the ammonia molar concentration is 10.7% and oxygen 18.1% and water vapor is subsequently removed from the product gas. In this case, the gas mixture, at a temperature of 25° C., is fed into the aniline (199.5 grams) at a rate of 375 milliliters per minute, the bulk temperature of the aniline rising to 35° C. Gas flow is stopped after 204 minutes. The weight of organic layer is 206.7 grams. Based on an aniline conversion of 16.4%, the yield of 1,3-diphenyltriazene is 42.4%, p-aminoazobenzene 31.6%, p-nitroaniline 16.3%, and o-nitroaniline 9.9%. The off-gas (nitrogen, 700 parts per million $NO_2$, aniline, water vapor, no oxygen) is chilled to 10° C. in the condenser to condense out aniline and triazene vapors and is vented. The hold-up time in the off-gas train maintained at about 15° C. is 8.5 seconds. No diazonium nitrate deposition is observed.

EXAMPLE 4

The procedure described in Example 1 is repeated with the exception that the gas mixture used has the composition (molar) 5.7% NO, 5.7% $NO_2$, 20.5% water vapor, and 68.1% nitrogen. This mixture is obtained when the ammonia content is 12.6% and oxygen 18.0%. In this case, the gas mixture at 200° C. (175°–225° C.) is fed into aniline (120 grams) at a rate of 750 milliliters per minute, the bulk temperature rising to 50° C. Gas flow is stopped after 90 minutes. Based on an aniline conversion of 31.3%, the yield of 1,3-diphenyltriazene is 90.4%, p-aminoazobenzene 7.9%, o-aminoazobenzene 0.49%, p-nitroaniline 0.20%, and o-nitroaniline 0.15%.

EXAMPLE 5

The procedure described in Example 1 is repeated with the exception that the gas mixture used has the composition (molar) 7.4% NO, 3.6% $NO_2$, and 89% nitrogen. This mixture is obtained when 13.7% ammonia and 17.8% oxygen are used in the ammonia oxidation, and water vapor is subsequently removed from the product gas. In this gas, the gas mixture, at an average temperature of 200° C. (175°–225° C.) is fed into a mixture consisting of 66.5 grams of aniline and 3.5 grams of nitrobenzene (internal standard) at a rate of 150 milliliters per minute, the bulk temperature being maintained at 50°–55° C. Gas flow is stopped after 121 minutes. The weight of recovered organic layer is 68.1 grams. Based on an aniline conversion of 12.6%, the yield of 1,3-diphenyltriazene is 96.8%, the p-aminoazobenzene 3.7%.

EXAMPLE 6

Aniline (69.9 grams) at room temperature is charged to a 150-milliliter glass reactor equipped with an outer condenser sleeve, two heated side-arm capillary gas inlet tubes (near the bottom of the reactor), a thermocouple, and a 150 millimeter-long water-cooled condenser.

A gas mixture having the composition 5.4% $NO_2$, 2.9% NO, 17% water vapor and 74.7% nitrogen at an average temperature of 200° C. (175°–225° C.) and a pressure of 1 atmosphere is fed into the room temperature aniline via one of the heated gas inlet tubes at a rate of 150 milliliters per minute. A second gas mixture having the composition of 3% oxygen and 97% nitrogen at an average temperature of 200° C. and a pressure of 1 atmosphere is fed into the aniline via a second heated gas inlet tube at a rate of 125 milliliters per minute such as to produce a final composition of 2.9% $NO_2$, 1.6% NO, 9.1% water vapor, 1.4% $O_2$ and 85% nitrogen. This mixture simulates a gas which has been produced by the oxidation of ammonia according to the present process followed by dilution with nitrogen to give a concentration of 4.5% $NO_x$. During the addition of the gases, the aniline is stirred at about 1000 revolutions per minute. The bulk temperature rises to 45°–50° C. and is maintained there by air cooling.

The gas flow is stopped after 211 minutes. The weight of organic layer is 68.2 grams. Based on an aniline conversion of 24.8%, the yield of 1,3-diphenyltriazene is 76.6%, p-aminoazobenzene 19.3%, o-aminoazobenzene 1,6%, p-nitroaniline 1.5%, and o-nitroaniline 1.0 %.

The off-gas contains 0.5 volume percent NO and 1.4 volume percent oxygen. No benzenediazonium nitrate deposits on the 25° C. walls of the off-gas line in the approximately 9 seconds the gas is held up therein.

EXAMPLE 7

The process of the invention is carried out in a continuous manner as follows:

a. Nitrogen oxide-containing gas mixture

Nitric oxide and air are fed into a pipeline reactor at 79 psig (5.4 atmospheres) at rates of 0.117 and 0.145 standard cubic feet (3.31 and 4.10 liters) per minute, respectively, with a hold-up time sufficient to allow the reaction of 95–97% of the oxygen fed and to produce a $NO_x$ wherein x is 1.5. Heated nitrogen is added to the product gas at a rate of 0.82 standard cubic feet (23 liters) per minute to give a final stream containing 10.8 mole percent $NO_x$ at a temperature of 74° C., and less than 0.14 mole percent residual oxygen. This gas mixture, except for water, simulates that which would be produced by burning 12.3% ammonia in air of 80% relative humidity at 30° C.

b. Aniline/$NO_X$ reaction

Aniline and water (the latter in the amount which would be present in the ammonia oxidation process gas described in Paragraph (a) are passed, at rates of 110 milliliters/minute and 4.6 milliliters/minute, respectively, through a water-cooled condenser and thence into a vapor-liquid separator designed for continuous drawoff. The reaction product solution (1,3-diphenyltriazene dissolved in aniline) and gases produced in a tubular reactor also pass into the separator, liquid being withdrawn from the separator continuously to maintain a constant level. Part of the withdrawn liquid is recovered, and part of it is recirculated through a cooler to maintain a temperature of 40°–50° C., and then to the tubular reactor at a rate of about 2300 milliliters per minute.

The nitrogen-containing $NO_x$ stream produced as described in Paragraph (a) is passed through the reactor cocurrently with the recirculated aniline solution stream, and the product (liquid and gas) passed into the separator as described above. The gas is chilled to 16° C. in the condenser (condensing out aniline and 1,3-diphenyltriazene vapors), and is vented. Analysis of the off-gas shows 1.34% NO and no $NO_2$ (90% $NO_x$ consumption).

Over an operating period of 6 hours, 7 minutes, periodic sampling and analysis indicate the present (by weight) of 19.0% 1,3-diphenyltriazene, 1.2% p-aminoazobenzene, and 0.05% aminodiphenyls. Unreacted aniline is determined to be 76%. On this basis, the yield of 1,3-diphenyltriazene is 93%.

EXAMPLE 8

A portion of the nitrous gas stream from a commercial ammonia oxidation process (AOP) unit engaged in the production of nitric acid is continuously withdrawn and reacted with aniline for a period of 155 minutes. In the AOP unit an ammonia-air mixture routinely containing 11.4–11.6 mole percent ammonia by analysis is catalytically burned over a platinum gauze catalyst at about 900° C. and 125 psig (8.5 atmospheres) to produce a nitrous gas containing nitric oxide, water vapor, some unreacted oxygen (3% by vol.), and the rest nitrogen. At a point in the AOP unit where the gas has been cooled to about 540° C., a portion of the gas is tapped off by pipeline at a rate of 140 pounds (63.6 kilorams) per hour, through a heat exchanger where it is cooled to 190° C. in about 1.5 seconds before being fed to a reactor tube where it is contacted with recirculating aniline solution at a flow rate of 25 gallons (95 liters) per minute. The exit of the reactor tube is in a gas/liquid separator designed for continuous drawoff. The reaction product solution (1,3-diphenyltriazene dissolved in aniline) and gases produced in the reactor pass into the separator, liquid being withdrawn from the separator continuously. Fresh aniline is continuously fed into the liquid stream emanating from the separator, at a rate of 480 pounds (216 kilograms) per hour, and product solution is continuously withdrawn to maintain constant inventory in the reactor and separator. Part of the withdrawn liquid is recovered, and part of it is recirculated through a cooler (to remove heat of reaction from the system and maintain a temperature of 50°–55° C. in the reactor and separator) and then to the reactor. The temperature at the reactor tube inlet is 47°–50° C.; the pressure at the reactor inlet is 35 psig (2.4 atmospheres) and at the exit (in the gas/liquid separator) 4 psig (0.3 atmosphere). The volume of the reaction tube is 0.186 cubic feet (52 liters). A liquid holdup of about 3 gallons (11 liters) is maintained in the separator whose total volume is about 12 gallons (45 liters).

Analysis of samples of the product solution are given in the following table. The yield of 1,3-diphenyltriazene, based on aniline, is 89 percent (17% aniline conversion).

|  | wt. % |
|---|---|
| 1,3-Diphenyltriazene | 16.3 |
| p-Aminoazobenzene | 1.77 |
| o-Aminoazobenzene | 0.16 |
| Aminodiphenyls | 0.07 |

Off-gas (50°–55° C.) leaving the separator comprises nitrogen, 0.4 volume percent NO, 3 volume percent oxygen, water, and aniline vapor (no $NO_2$). This gas is passed through a 60° C. wall off-gas line at 4 psiga (0.3 atmosphere) with a residence time of 0.05–0.1 second before entering a water scrubber to remove aniline. No benzenediazonium nitrate deposition is observed.

CONTROL EXPERIMENT

If the preceding off-gas contains 1% NO, the wall temperature is 25° C., and the pressure 1 atmosphere, benzenediazonium nitrate deposition occurs in 5 seconds. If, in addition, the temperature of the off-gas leaving the separator is 25° C., benzenediazonium nitrate deposits on the wall of the off-gas line also in 5 seconds.

I claim:
1. A method of preparing a 1,3-diaryl triazene comprising, in sequence, catalytically oxidizing ammonia by means of a gas comprising diluted molecular oxygen so as to form a gas mixture comprising a dilute nitrogen oxide component selected from the group consisting of nitrogen dioxide ($NO_2$) and mixtures of nitrogen dioxide and nitric oxide, said nitrogen oxide component being represented by the formula $NO_x$ wherein $x$ is (1 + $n$), $n$ being the $NO_2$ fraction of the nitrogen oxide component; and contacting said gas mixture with a primary carbocyclic aromatic monoamine in the liquid phase so as to result in a monoamine temperature in the range of about from 25° C. to 90° C. during contact, while maintaining at least about 5 percent by weight of unconsumed monoamine.

2. A method of claim 1 wherein said primary carbocyclic aromatic monoamine is selected from the group consisting of unsubstituted, alkyl-substituted, and halo-substituted aniline and naphthylamines.

3. A method of claim 1 wherein ammonia is oxidized at a temperature in the range of 800° to 950° C. and the resulting gas is cooled to a temperature below about 500° C. so as to form said gas mixture.

4. A method of claim 3 wherein said gas comprising diluted molecular oxygen is air, the $NO_x$ content of the gas mixture is about from 10 to 12 mole percent, and $x$ is in the range of from about 1.1 to 2.0.

5. A method of claim 4 wherein said nitrogen oxide component is a mixture of nitrogen dioxide and nitric oxide.

6. A method of claim 5 wherein $x$ is in the range of about from 1.3 to 1.7.

7. A method of claim 6 wherein the temperature of said gas mixture just prior to its contact with the monoamine is in the range of about from 25° to 350° C.

8. A method of claim 7 wherein the temperature at which said monoamine is maintained while it is in contact with said mixture is in the range of about from 40° C. to 60° C.

9. A method of claim 7 wherein the amount of said gas mixture contacted with said monoamine and the time of said contact are such that at least about 40 percent by weight of unconsumed monoamine is maintained.

10. A method of claim 7 wherein said gas mixture is contacted with neat monoamine.

11. A method of claim 10 wherein the amount of said gas mixture contacted with said monoamine and the time of said contact are such that at least about 60 percent by weight of unconsumed monoamine is maintained.

12. A method of preparing 1,3-diphenyltriazene comprising, in sequence, catalytically oxidizing ammonia by means of air so as to form a gas mixture comprising a mixture of nitrogen dioxide and nitric oxide as a nitrogen oxide component, said nitrogen oxide component being represented by the formula $NO_x$ wherein $x$ is $(1 + n)$, $n$ being the $NO_2$ fraction of the nitrogen oxide component, and is in the range of about from 1.3 to 1.7, the $NO_x$ content of said gas mixture about from 10 to 12 percent; and contacting said gas mixture at a temperature in the range of about from 25° C to 350° C with aniline in the liquid phase so as to result in an aniline temperature in the range of about from 25° C. to 90° C. during contact, while maintaining at least about 40 percent by weight of unconsumed aniline.

13. A method of claim 12 wherein said gas mixture is contacted with neat aniline, and the amount of said gas mixture contacted with said aniline and the time of said contact are such that at least about 60 percent by weight of unconsumed aniline is maintained.

14. A method of claim 5 wherein said primary carbocyclic aromatic monoamine is aniline or o- or m-toluidine.

* * * * *